(12) United States Patent
Etou (10) Patent No.: US 7,063,178 B2
(45) Date of Patent: Jun. 20, 2006

(54) FRAME ASSEMBLY FOR SNOWMOBILE

(75) Inventor: Toyochika Etou, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 141 days.

(21) Appl. No.: 10/213,726

(22) Filed: Aug. 6, 2002

(65) Prior Publication Data

US 2003/0029658 A1    Feb. 13, 2003

(30) Foreign Application Priority Data

Aug. 9, 2001   (JP)  ............................. 2001-241585

(51) Int. Cl.
    *B62M 27/02*      (2006.01)
(52) U.S. Cl. ...................... 180/190; 180/186
(58) Field of Classification Search ............... 180/182, 180/181, 190, 186, 191–195; 280/15–17, 280/21.1
See application file for complete search history.

(56) References Cited

U.S. PATENT DOCUMENTS

| 5,857,385 A | 1/1999 | Takeuchi |
| 5,862,662 A | 1/1999 | Fukuda et al. |
| 5,944,133 A | 8/1999 | Eto |
| 5,957,230 A | 9/1999 | Harano et al. |
| 5,992,552 A | 11/1999 | Eto |
| 6,446,744 B1 * | 9/2002 | Wubbolts et al. ........... 180/190 |
| 2003/0047368 A1 * | 3/2003 | Morin et al. ................ 180/190 |
| 2003/0150658 A1 * | 8/2003 | Nakano et al. ............. 180/190 |

FOREIGN PATENT DOCUMENTS

JP      9-193880      7/1997

* cited by examiner

*Primary Examiner*—Anne Marie Boehler
(74) *Attorney, Agent, or Firm*—Knobbe, Martens, Olson & Bear, LLP (57) ABSTRACT

A snowmobile has a body frame. A rear frame is coupled with the body frame. The rear frame defines a generally horizontally extending bottom section. Side sections generally vertically extend from side portions of the bottom section. A rear section generally vertically extends from a rear portion of the bottom section. The bottom, side and rear sections are unitarily formed by a casting process or a press working.

16 Claims, 11 Drawing Sheets

FRAME ASSEMBLY FOR SNOWMOBILE

RELATED APPLICATIONS

This application is based upon and claims priority to Japanese Patent Application No. 2001-241585, filed on Aug. 9, 2001, which is hereby incorporated by reference in its entirety.

BACKGROUND OF THE INVENTION

1. Field of the Invention

The present invention is directed to a frame assembly for a snowmobile, and more particularly to an improved rear frame assembly for a snowmobile.

2. Description of the Related Art

A typical snowmobile includes a frame assembly, a drive assembly including an endless drive belt for propelling the snowmobile, and a slide rail unit that supports the drive belt. The frame assembly carries an engine which powers the drive belt through a suitable transmission and drive mechanism.

Typically, a pair of front skis depends from the frame assembly for steering the snowmobile. A steering handle extends to the rider's area from the frame assembly so that the rider can operate the steering handle. A steering linkage couples the skis with the steering handle. The frame assembly also includes a rear portion, which is formed of a plurality of connected pieces extending over the drive belt and supporting the operator and passengers.

SUMMARY OF THE INVENTION

One aspect of the present invention includes the realization that the rear portion of a snowmobile frame can become deformed through use. For example, but without limitation, conventional snowmobile frames include rear portions constructed of a plurality of separate pieces that are connected with weld, rivets, bolts, or other fasteners. This portion of the frame can also be used to support a portion of the seat, a grab handle, and/or an exhaust silencer. However, after prolonged use, the rear portion of such a frame portion can become deformed. For example, the repeated heating and cooling of the exhaust silencer subjects the rear portion of the frame to thermal fatigue. Such thermal fatigue can damage and/or loosen the connections between the plurality of pieces forming the rear portion of the frame be damaged. Further, the thermal fatigue can cause some of the pieces to deform from their original shape. Additionally, loads transferred to the rear portion of the frame from the seat and/or the grab handle can damage or loosen the connections as well as deform the component pieces of the rear portion of the frame.

Deformation of the rear portion of the frame can make it more difficult to move the snowmobile by the grab handle. Additionally, damage to or loosening of the connections between the component pieces of the rear portion of the frame can cause additional noises that are annoying to the operator and passengers of the snowmobile. Where the rear portion of the frame is used to support an exhaust component, additional noises can be generated by the vibrations carried by the exhaust gasses flowing through such an exhaust component.

In accordance with one aspect of the present invention, a snowmobile comprises a frame assembly. A drive assembly depends from the frame assembly and is adapted to abut terrain so as to propel the frame assembly along the terrain. The frame assembly comprises a body frame. A rear frame is coupled with the body frame. The rear frame defines a generally horizontally extending bottom section. Side sections generally vertically extend from side portions of the bottom section. A rear section generally vertically extends from a rear portion of the bottom section. The bottom, side and rear sections being monolithically formed with each other.

In accordance with another aspect of the present invention, a snowmobile comprises a frame assembly. A drive assembly depends from the frame assembly and is adapted to abut the terrain so as to propel the frame assembly along the terrain. The frame assembly comprises a body frame. A rear frame is coupled with the body frame. The rear frame defines a generally horizontally extending bottom section. Side sections generally vertically extend from side portions of the bottom section. A rear section extends generally vertically from a rear portion of the bottom section. Each one of the side and rear sections forms an inner wall, an outer wall and a top wall connecting the inner and outer walls. The inner and outer walls are spaced apart from each other.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise eleven figures.

DETAILED DESCRIPTION OF THE PREFERRED EMBODIMENT

Figure 1:
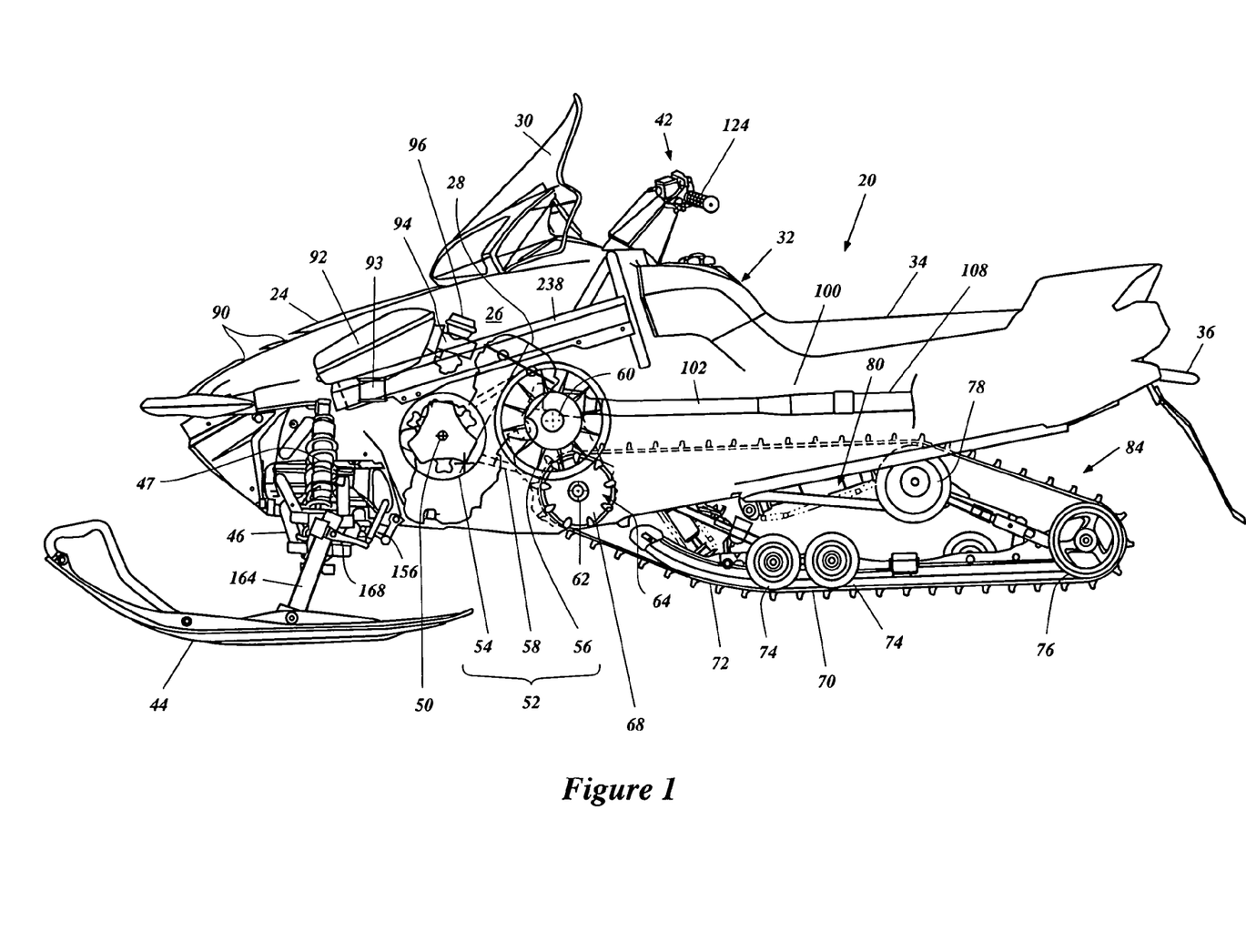
FIG. 1 is a side elevational view of a snowmobile having a frame assembly arranged and configured in accordance with certain features, aspects and advantages of the present invention. Certain portions are illustrated as being broken away and other internal portions are shown in hidden line.
Figure 2:
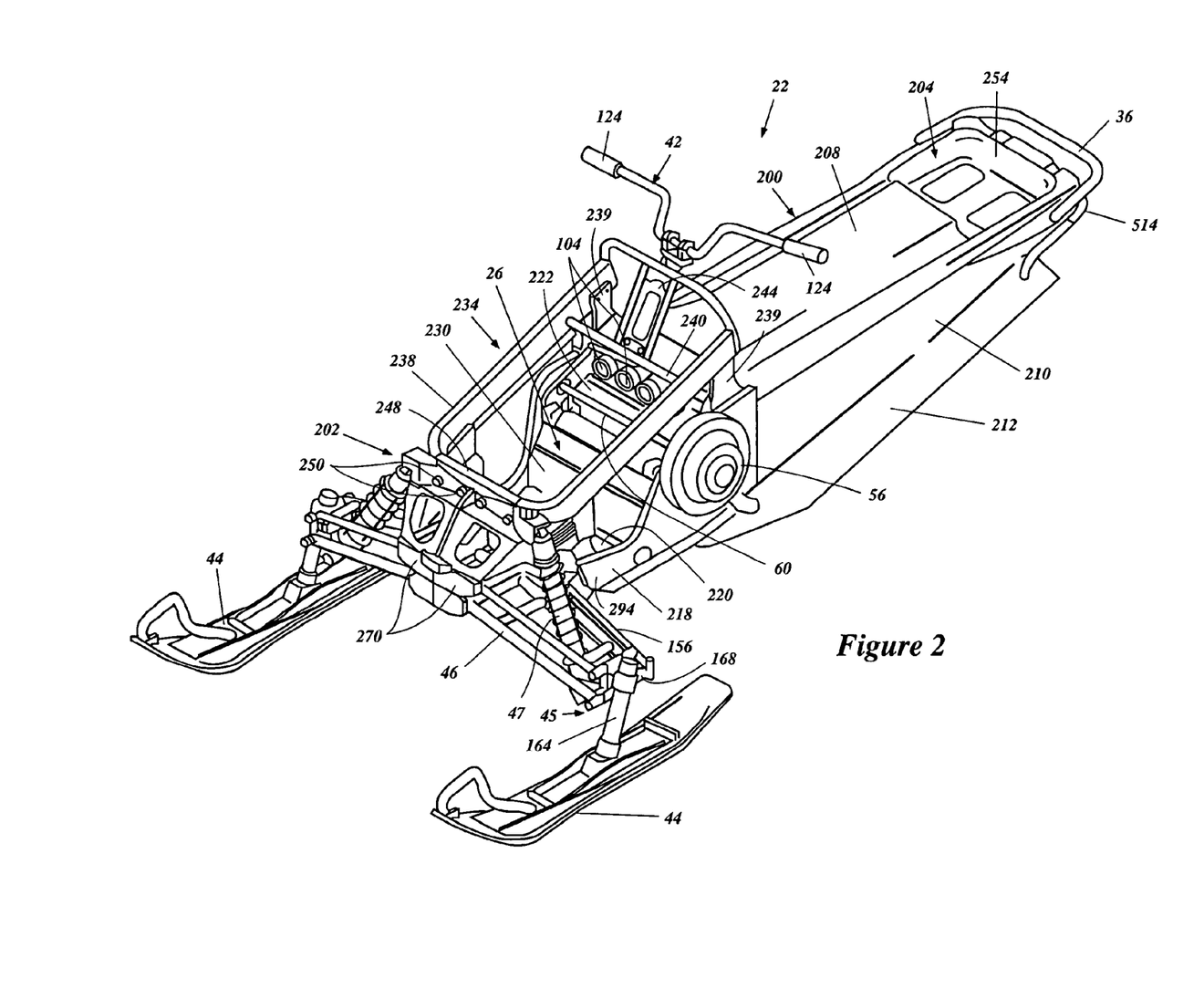
FIG. 2 is a perspective view of the frame assembly of FIG. 1 with certain components, such as an engine, being removed.
Figure 4:
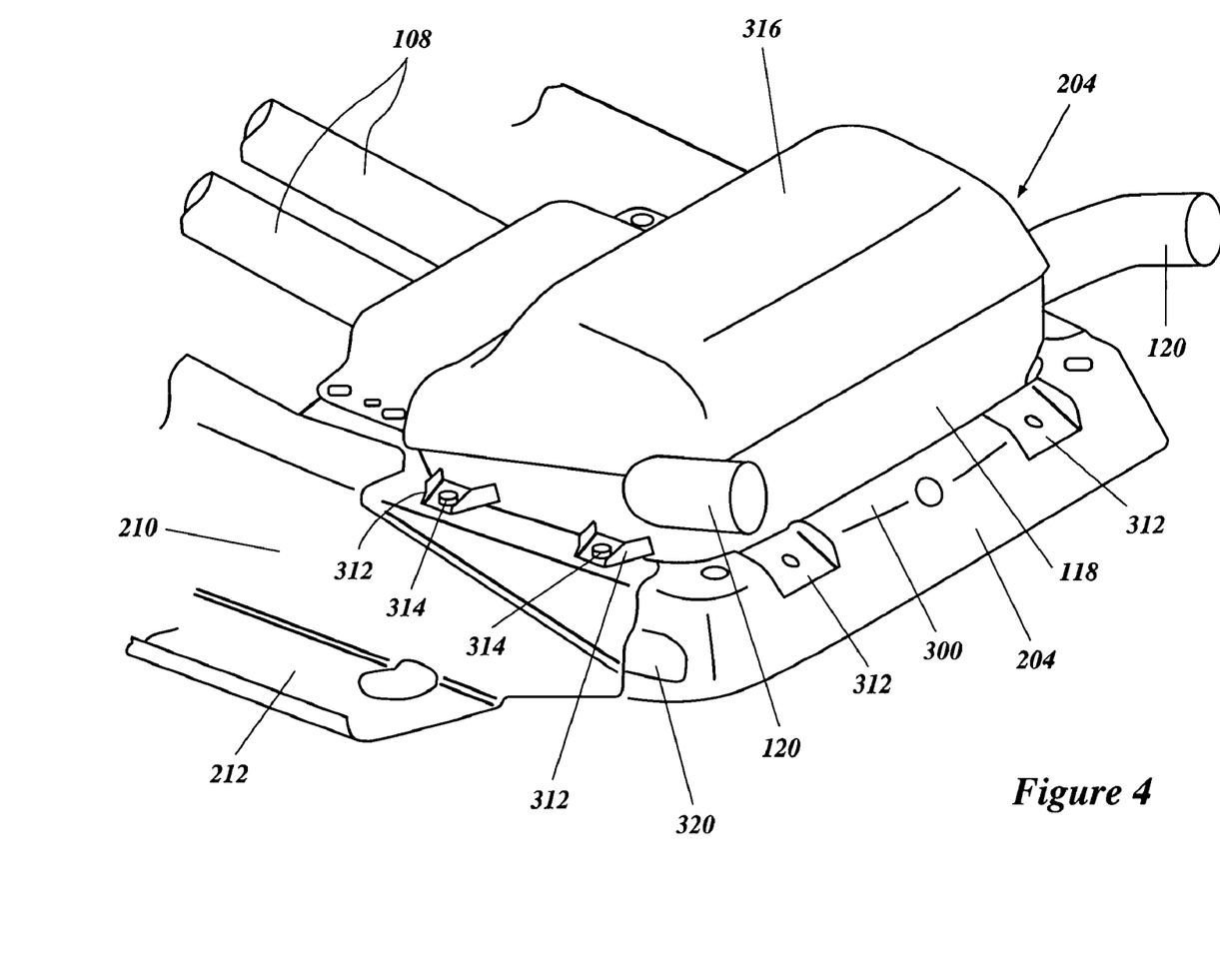
FIG. 4 is a partial perspective view of the frame assembly shown in FIG. 3 with the rear portion of the frame assembly assembled and an supporting an exhaust component.

With particular reference to FIGS. 1, 2 and 4, an overall construction of a snowmobile 20 including certain features, aspects and advantages of the present invention is described below.

The snowmobile 20 generally comprises a frame assembly 22 (FIG. 2) that carries a number of other components of the snowmobile 20. The frame assembly 22 is described below in greater detail. A forward body cover 24 is disposed over a forward portion of the frame assembly 22. As illustrated in FIG. 1, the forward body cover 24 covers, in part, an engine compartment 26 in which an engine 28 is mounted. The engine 28 preferably is an in-line, four-cylinder, water-cooled, four-cycle engine and is described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic and other reasons.

Rearward of the fuel tank 32, a seat 34 is mounted to the frame assembly 22. Rearward of the seat 34 is positioned a grab bar 36 that can be used to raise a rear portion of the snowmobile 20 for turning and maneuvering when the snowmobile 20 is not being ridden.

Forward of the seat 34 and the fuel tank 32 is a steering handle assembly 42. The steering handle assembly 42 can carry appropriate controls and is coupled to a pair of front skis 44 by a steering linkage (not shown). Each front ski 44 has a pivot shaft which is supported by a holder 45. The holders 45 are mounted to the frame assembly 22 through a pair of swing units 46. As the handle assembly 42 is turned, the pivot shafts of the skis 44 pivot clockwise and counter-clockwise about axes of the holders 45. As the skis 44 pivot, the direction of the snowmobile 20 can be altered.

A pair of suspension assemblies 47 also is provided between the frame assembly 22 and the skis 44. Each suspension assembly 47 preferably comprises a shock absorber unit (for example, a cylinder type) and a coil spring to absorb shocks from the rough terrain and vibrations made by the rough terrain, although any other construction can be applied.

The engine 28 is mounted to the frame assembly 22 in any suitable manner. A set of resilient engine mounts can be used to secure the engine 28 to the frame assembly 22. By mounting the engine 28 with the resilient engine mounts, vibrations caused by operation of the engine 28 are reduced or eliminated before transmission through the frame assembly 22 to the operator.

With reference to FIG. 1, the engine 28 in the illustrated arrangement is inclined rearwardly relative to vertical, and is mounted transversely within the engine compartment 26. Cylinders of the engine 28 extend side-by-side across a width of the snowmobile 20. In some arrangements, engines having differing numbers of cylinders, different cylinder configurations (e.g., V, W, opposing, etc.), different orientations (e.g., vertical) and different operating principles (e.g., two-stroke, rotary, diesel, etc.) can be used.

The engine 28 also comprises a crankshaft (not shown) that extends transversely and an output shaft 50 that extends parallel to the crankshaft and is driven by the crankshaft. The output shaft 50 drives a transmission, which is a continuously variable transmission 52 in the illustrated arrangement. Other transmissions also can be used. In the illustrated arrangement, the transmission 52 comprises a drive pulley 54, a driven pulley 56 and a v-belt 58. The output shaft 50 rotates the drive pulley 54. The output shaft 50 and the drive pulley 54 can be connected together through a clutch, a centrifugal clutch, a sprag clutch or can be directly connected together.

The drive pulley 54 powers the driven pulley 56 with the v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62. The sprockets are connected together by a chain in one arrangement and these three components are disposed within a chain box (not shown).

The drive shaft 62 powers a drive unit 64. The drive unit 64 generally comprises a plurality of drive wheels 68. The illustrated drive unit 64 comprises four drive wheels 68. The drive wheels 68 provide a motive force to a drive belt 70, which is commonly used in the snowmobile industry. The drive belt 70 abuts the terrain.

The drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly 22 with a rear suspension system 80. Any suitable rear suspension system 80 can be used and certain portions of the rear suspension system 80 have been schematically illustrated in the illustrated arrangement.

The drive belt 70, the slide rails 72, the suspension wheels 74, the main rear suspension wheels 76, the idle roller 78 and the rear suspension system 80 generally form a drive assembly 84 in the illustrated embodiment.

With continued reference to FIG. 1, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a suitable manner. An inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28.

One of the charge formers 96 preferably correspond to each cylinder. In some arrangements, a single charge former can be used upstream of a separation point for runners extending to individual cylinders. In addition, in the illustrated arrangement, the engine 28 is carbureted. Alternatively, the charge formers 96 can be fuel injectors that are mounted for direct injection, indirect injection or port injection.

The air-fuel charge provided in this manner is combusted within the engine in a suitable manner. The combustion byproducts then are exhausted through a suitable exhaust system 100. In the illustrated arrangement, the exhaust system 100 extends directly rearward from the engine 28. In this manner, an exhaust runner 102 that extends rearward from the engine 28 can be tuned to the engine 28 for improved engine performance. Additionally, the length of each runner 102 can be lengthened prior to merging together with any other runners such that pulse effects on adjoining cylinders can be reduced. The exhaust runners 102 correspond to each cylinder and extend generally rearward from the engine 28. Each exhaust runner 102 is coupled to the engine 28 through openings 104 (FIG. 2) in the illustrated arrangement. In some arrangements, a single manifold can be used.

With continued reference to FIG. 1, the runners 102 preferably are joined to merge into manifold pipes 108. The manifold pipes 116 extend rearward to a silencer box 118 (FIG. 4). The silencer box 118 provides an enlarged volume into which the exhaust can flow. Exhaust energy is dissipated within the silencer box 118 and the noise level of the exhaust can be decreased. The silencer box 118 preferably is disposed rearward of the seat 34. A preferred position and arrangement of the silencer box 118 is described in greater detail below.

A pair of exhaust pipes 120 (FIG. 4) preferably extends rearward from the silencer box 118. In some arrangements, a single exhaust pipe can extend from the silencer box 118. One end of the exhaust pipes 120 preferably defines an ultimate exhaust discharge from the snowmobile 20 such that the exhaust gases are discharged into the atmosphere.

Figure 3:
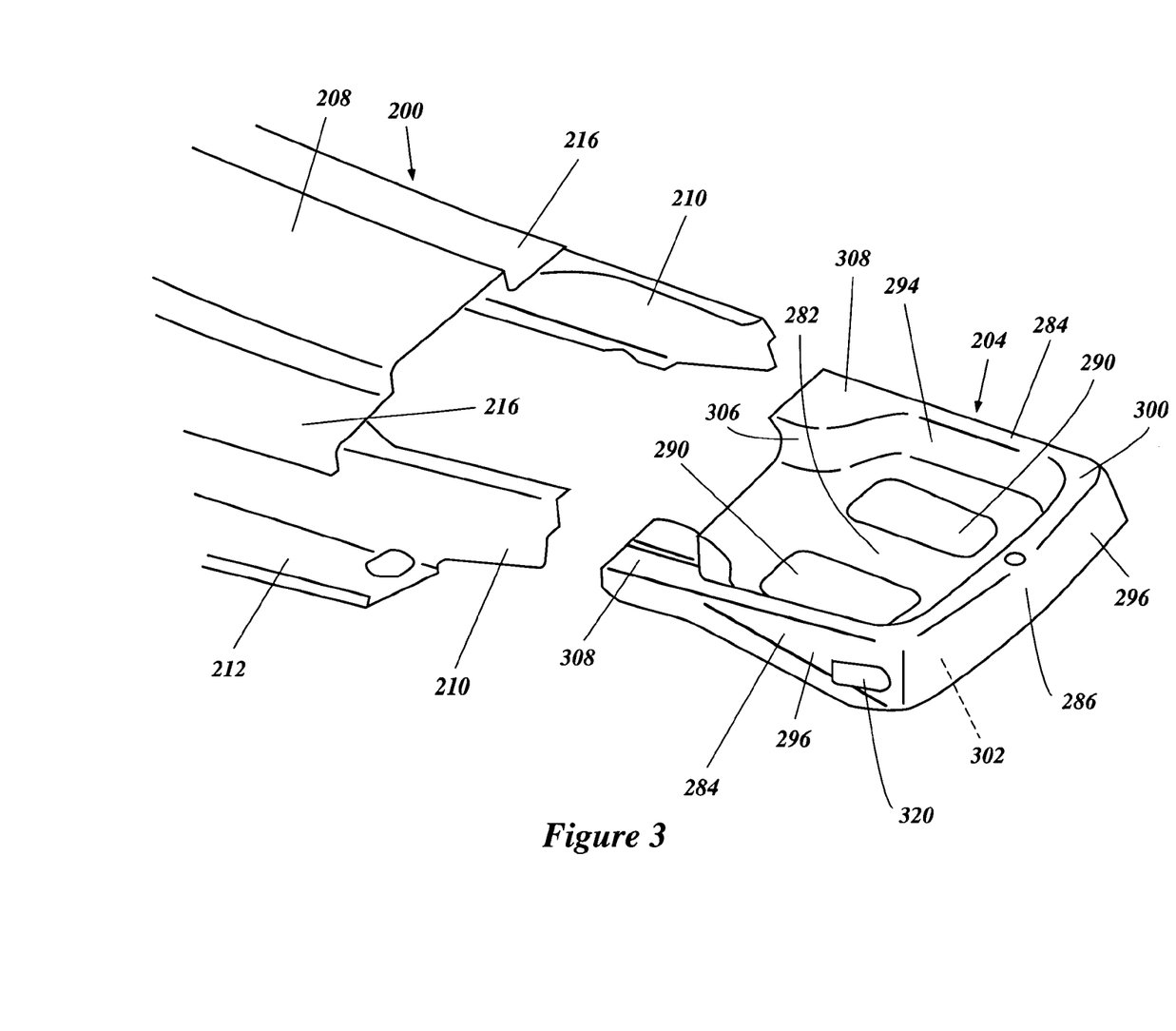
FIG. 3 is a partial perspective and exploded view of a rear portion of the frame assembly.

With reference to FIGS. 2 and 3, a general construction of the frame assembly 22 is described in greater detail below.

The frame assembly 22 generally comprises a body frame 200, a front frame 202 and a rear frame 204. The body frame 200 is disposed center of the frame assembly 22 and forms a main body of the snowmobile 20. The front frame 202 is disposed forward of the body frame 200 and forms a front body of the frame assembly 22. The rear frame 204 is disposed rear of the body frame 200 and forms a rear body of the frame assembly 22.

The body frame 200 preferably comprises an upper horizontal section 208, side vertical sections 210 and lower horizontal sections 212. The upper horizontal section 208 extends fore to aft and forms a center area of the body frame 200. The side vertical sections 210 extend vertically downwardly from both sides of the upper horizontal section 208. The lower horizontal sections 212, in turn, extend horizontally outwardly from lower ends of the side vertical sections 210.

The lower horizontal sections 212 preferably form foot step areas. In the illustrated arrangement, heat exchange devices 213 (see FIGS. 9 and 10) are unitarily formed with the respective lower horizontal sections 212. The heat exchange devices 213 and an engine cooling system 214 (see FIGS. 9 and 10) that includes the heat exchange devices 213 are described in greater detail below with reference to FIGS. 9 and 10.

Preferably, as shown in FIG. 3, the upper horizontal section 208 is formed separately from the other part of the body frame 200. The upper horizontal section 208 can be made of, for example, a sheet metal. The upper horizontal section 208 also includes side portions 216 which are positioned lower than a center portion thereof to reinforce the section 208.

The upper horizontal section 208 can be formed by, for example, a press working. The side vertical sections 210 and the lower horizontal sections 212 preferably are unitarily formed with each other and are made of, for example, pressed sheet metal, or are made of an extruded aluminum alloy material. The side vertical sections 210 extend beyond rear ends of the upper and lower horizontal sections 210, 212. Each side vertical section 210 has a flapped top portion which has a smaller area than the side 216 of the upper horizontal section 208.

The sections 208, 210, 212 can be entirely unitarily formed with each other. To the contrary, the sections 208, 210, 212 can be formed from separate pieces, respectively. Additionally, the sections 208, 210, 212 can be produced by any methods other than the methods described above. For example, the sections 208, 210, 212, unitarily formed or separately formed, can be produced by a mold casting, die-casting or lost-wax casting process. Similarly, the other components and/or members described below also can be formed with any metal or plastic material and can be formed by any conventional method regardless of being expressly described or not, unless being otherwise explained.

The illustrated body frame 200 additionally comprises side panels 218, a floor panel 220 and a frame member 222, which preferably are produced by a mold casting, die-casting or lost-wax casting process.

The side panels 218 are affixed to the respective side sections 210 by welding or by fasteners such as, for example, bolts or rivets. The side panels 218 define openings (not shown) through which the transfer shaft 60 (FIG. 1) extends. The driven pulley 56 is positioned aside the side panel 218 on the left side. The floor panel 220 extends between lower ends of the side panels 218 to form a bottom portion of the engine compartment 26.

The frame member 222 extends between upper portions of the side panels 218 and generally covers a front end of the upper horizontal section 208. The frame member 222 defines the rear engine mounts 48 and the openings 104 for the exhaust runners 102 (FIG. 1).

A further heat exchange device 230 for the engine 28 is disposed below the frame member 222. Cooling water for cooling the engine 28 also circulates through the heat exchange device 230. The heat exchange device 230 preferably is affixed to the side panels 218 and the frame member 222 and form part of the frame assembly 22 together with the side panels 218.

The body frame 200 thus is rigidly formed with the foregoing components and members. To further increase the rigidity of the frame assembly 22 and to be coupled with the front frame 202, the frame assembly 22 preferably includes a frame reinforcement 234 (FIG. 2) secured to the body frame 200. This reinforcement 234 desirably is generally rectangularly shaped and advantageously is disposed generally above the engine 28. Thus, the engine 28 is positioned within a cavity defined between the side panels 218, above the floor panel 220, forward of the frame member 222 and below the reinforcement 234.

The illustrated reinforcement 234 preferably comprises a generally rectangular tubular member 238 that is bent into a U-shape. The tubular member 238 preferably is made of an extruded aluminum alloy material. Rear ends of the tubular member 238 are affixed to upwardly extending sections 239 of the frame member 222. A bight of the U-shape is disposed forwardly in the illustrated arrangement. A bar 240 extends between the two legs of the U-shaped tubular member 238 at the end opposite the bight. The bar 240 reinforces the open end of the U-shape defined by the tubular member 238. A second bar 242 extends upward and between rear ends of the tubular member 238 to further reinforce the reinforcement 234. Furthermore, a support unit 244 extends upward and rearward from the bar 240 to the second bar 242. The steering handle assembly 42 preferably is affixed to the support unit 244.

A holder member 248 is coupled with a front portion of the tubular member 238 by welding or by fasteners such as, for example, bolts or rivets. The holder member 248 preferably is made of sheet metal and is formed by a bending process. The front portion of the tubular member 238 is nested in a recessed portion defined by the holder member 248. Four bolts 250, for example, are mounted at the holder member 248 with threaded portions thereof extending generally upwardly and forwardly.

With continued reference to FIG. 2, the front frame 202 preferably comprises a pair of generally symmetrically formed front members 270 which are coupled with each other. Preferably, the front members 270 are made of aluminum alloy and are formed by, for example, a mold casting, a die-casting or lost-wax casting process. Each side portion of the front members 270 is coupled with a respective side panel 218 by welding or by suitable fasteners such as, for example, bolts or rivets.

The front member 270 supports the swing units 46 on the respective side portions. Each swing unit 46 in the illustrated arrangement is formed with a pair of linked tubular members disposed above and below each other, although any other constructions can be applied. Each side portion of the front members 270 defines a recess (not shown) recessed inwardly. Each swing unit 46 is placed at the recess and is swingably journaled on the side portion.

A top side portion of each front member 270 forms a mount boss. A top end of each suspension assembly 47 is journaled at the mount boss for pivotal movement. A lower end of each suspension assembly 47 is affixed to a portion of the lower linked member of each swing unit 46 where the holder 45 is attached, or is directly affixed to the holder 164.

Figure 9:
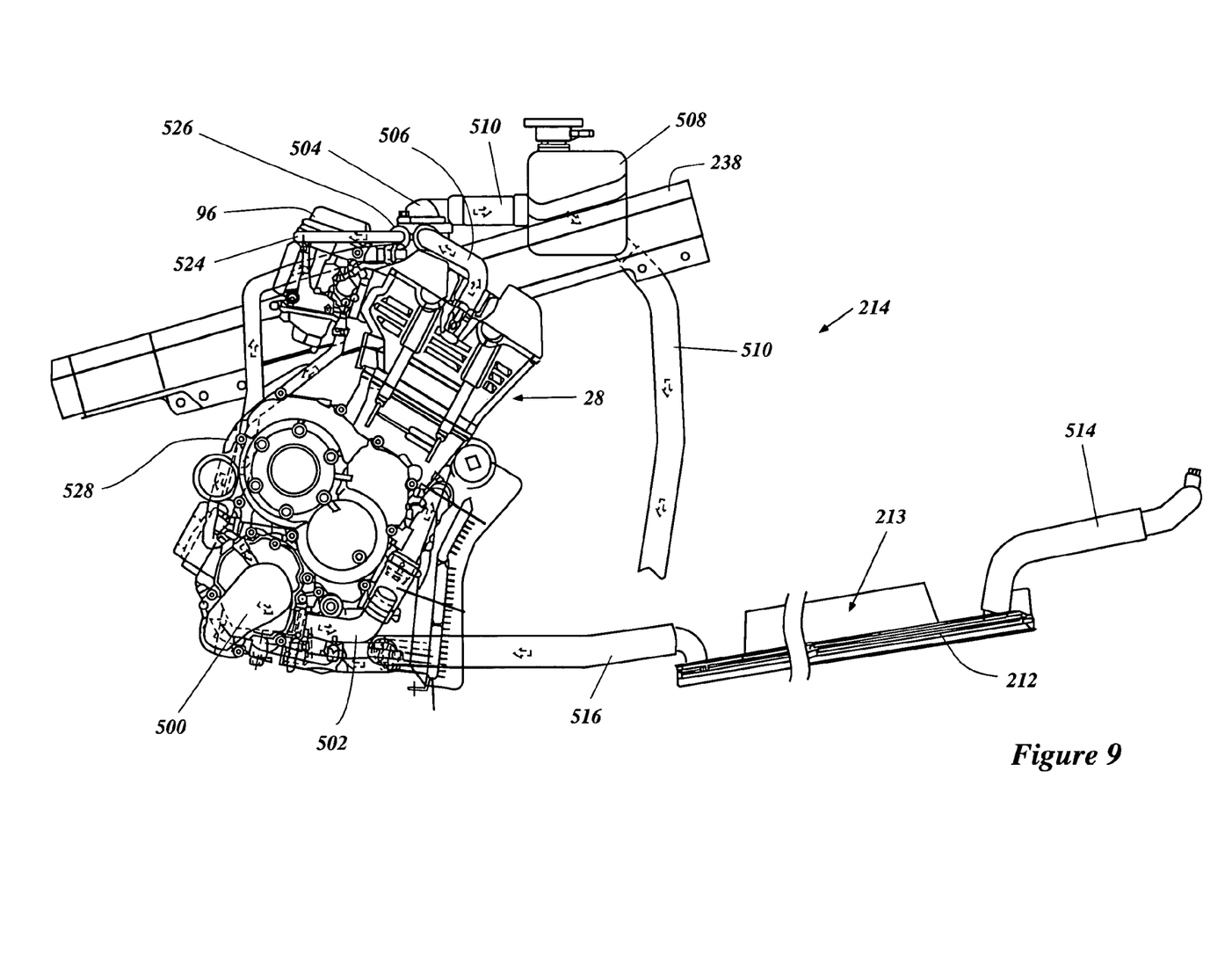
FIG. 9 is a schematic side elevational view of an engine cooling system of the snowmobile shown in FIG. 1. A portion of the frame assembly is illustrated in the figure.
Figure 10:
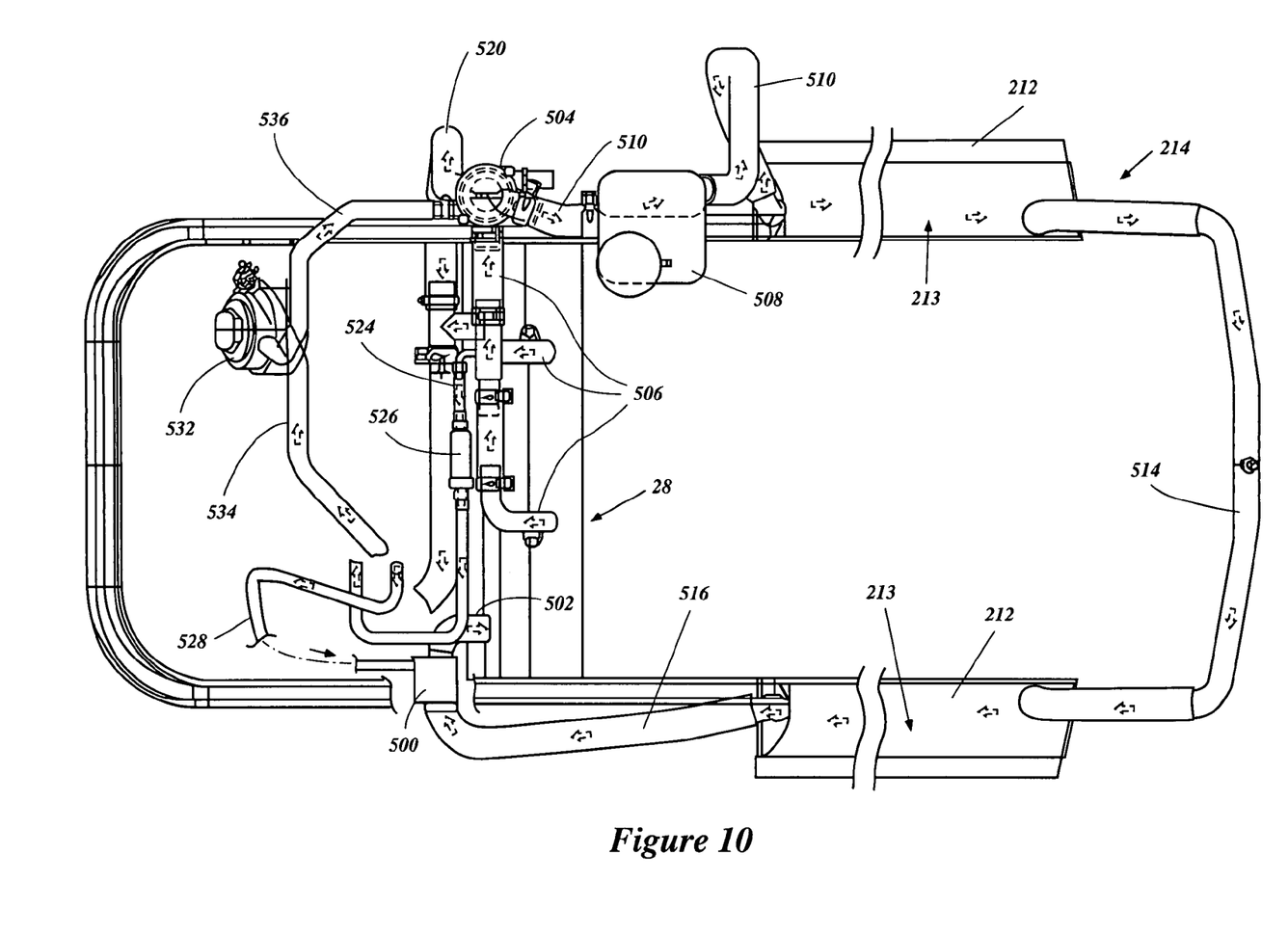
FIG. 10 is a schematic top plan view of the engine cooling system shown in FIG. 9.
Figure 11:
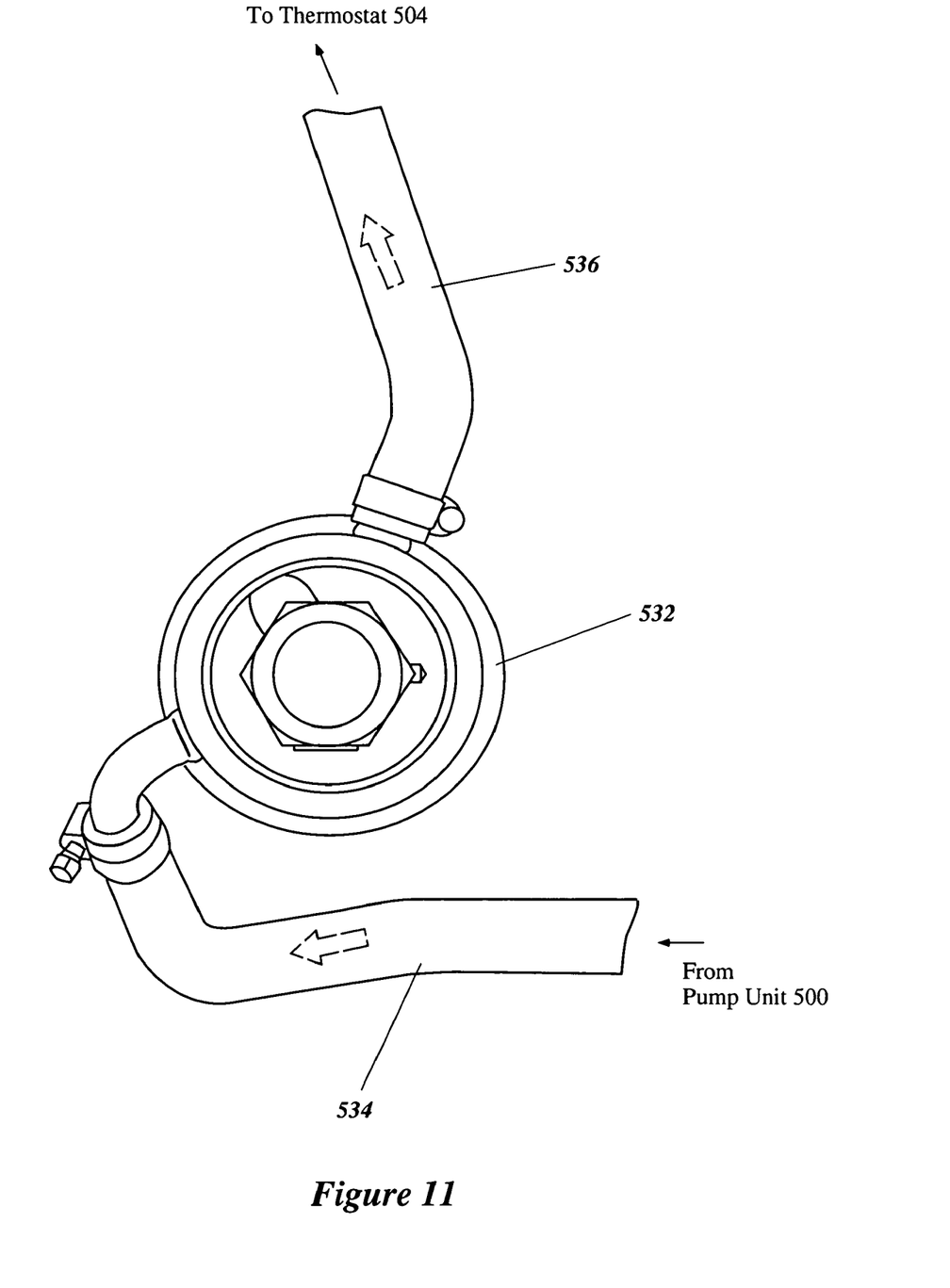
FIG. 11 is an enlarged and partial front elevational view of the engine cooling system shown in FIG. 9 and showing a portion thereof around an oil cooler of the snowmobile.

With reference to FIGS. 9–11, the engine cooling system 214 and the heat exchange devices 213 are described below in greater detail.

The engine cooling system 214 preferably is a closed-loop type and has a water pump unit 500. The pump unit 500 is connected to an inlet of a water jacket (not shown) of the engine 28 through a delivery conduit 502 to pressurize the cooling water to the water jacket. An outlet of the water jacket is connected to an inlet of a thermostat 504 through a delivery conduit 506. An outlet of the thermostat 504 is connected to an inlet of a water reservoir 508 through a delivery conduit 510. An outlet of the water reservoir 508 is connected to an inlet of the heat exchange device 213 on the right hand side. As described above, the heat exchange device 213 on this side is unitarily formed with the respective lower horizontal section 212.

An outlet of the heat exchange device 213 on the right hand side is connected to an inlet of the heat exchange device 213 on the left hand side through a delivery conduit 514. Similarly to the right hand side construction, the heat exchange device 213 on this side is unitarily formed with the corresponding lower horizontal section 212. An outlet of the heat exchange device 213 on the left hand side is connected to an inlet of the pump unit 500 through a delivery conduit 516.

The cooling circuit described above is a primary route of the cooling water for the engine cooling system 214. The cooling water is pressurized by the pump unit 500 to the water jacket of the engine 28. The water travels through the water jacket and moves to the thermostat 504. The thermostat 504 allows the water to move to the heat exchange device 213 on the right hand side through the water reservoir 508 if a temperature of the water exceeds a preset temperature. If the water temperature does not exceed the preset value, the thermostat 504 prevents the water from moving to the heat exchange device 213.

The engine cooling system 214 also includes a bypass. The bypass includes a bypass conduit 520 connecting the outlet of the thermostat 504 to the inlet of the pump unit 500. When the thermostat is closed, the water flows through the bypass and re-circulates through the engine water jacket without passing through the heat exchange devices 213. Thus the cooling water is more quickly heated to the preset temperature.

The engine cooling system 214 also includes a further cooling circuit for adjusting a temperature of the charge former 96, which is a carburetor in the illustrated embodiment. A coolant delivery conduit 524 connects the conduit 506 with an inlet of the carburetor 96. Another thermostat 526 is disposed in-line in the delivery conduit 524 to adjust a flow of the water through the charge former 96 according to the temperature of the water therein. The outlet of the water jacket in the carburetor 96 is connected to the inlet of the pump unit 500 through a delivery conduit 528.

The engine cooling system 214 has a yet another cooling circuit for cooling the lubricating oil circulated through the engine 28. An inlet end of a delivery conduit 534 is connected to the delivery conduit 502 at a position adjacent to the outlet of the pump unit 500. The outlet of the delivery conduit 534 is connected to an inlet of a water jacket disposed in thermal communication with oil within an oil cooler 532. An outlet of the oil cooler water jacket is connected to the inlet of the thermostat 504 through a delivery conduit 536. The oil cooler 532 forms part of a lubrication system of the engine 28. The water in the primary route thus can absorb heat from lubricant oil in the lubrication system and transfer the heat to the heat exchange devices 213.

With reference to FIGS. 2 and 3 and with additional reference to FIGS. 5–8, the rear frame 204 is described below in greater detail.

The rear frame 204 preferably comprises a single rear member. The illustrated rear frame 204 defines a generally horizontally extending bottom section 282. Side sections 284 extend generally vertically from the periphery of the bottom section 282. A rear section 286 extends generally vertically from a rear portion of the bottom section 282. Preferably, the rear frame 204 is made of a casting and is formed by, for example, a mold casting, die-casting or lost wax-casting process. Alternatively, the rear member frame 204 can be made of a sheet metal and shaped through a press working. Other materials and methods, of course, are applicable.

Figure 5:
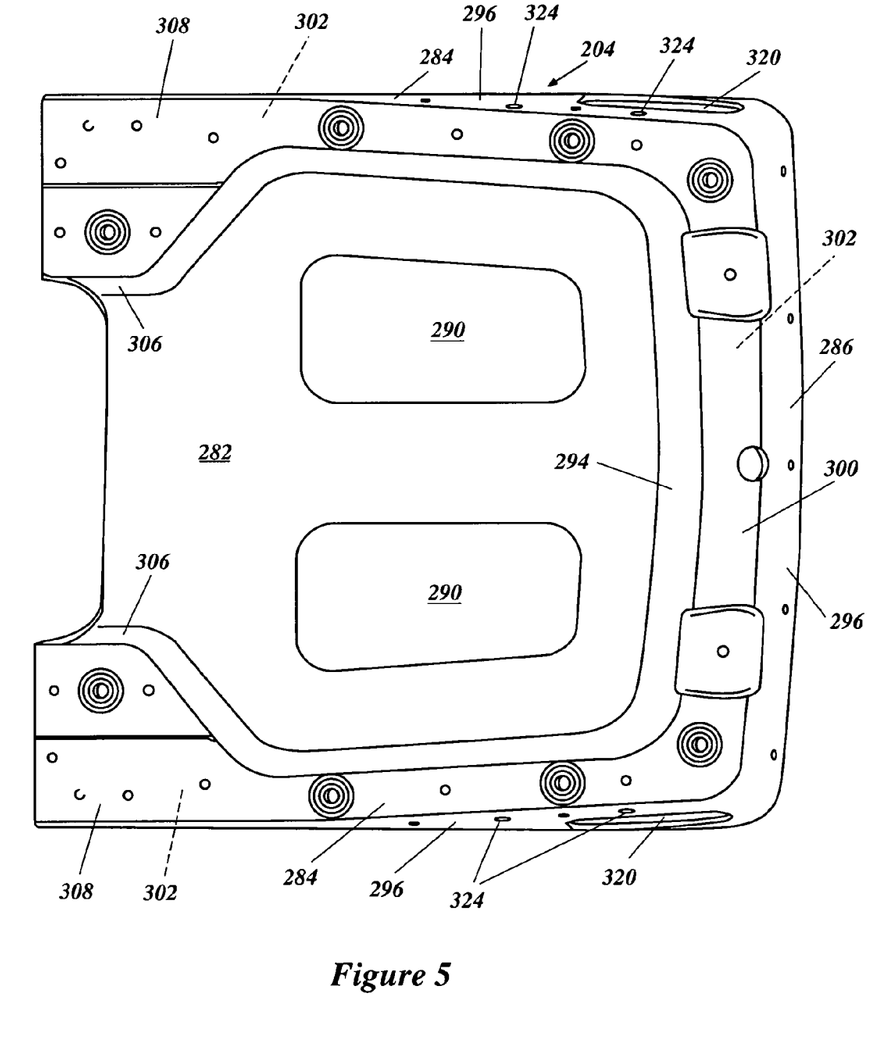
FIG. 5 is a top plan view of the rear portion of the frame illustrated in FIG. 3.
Figure 6:
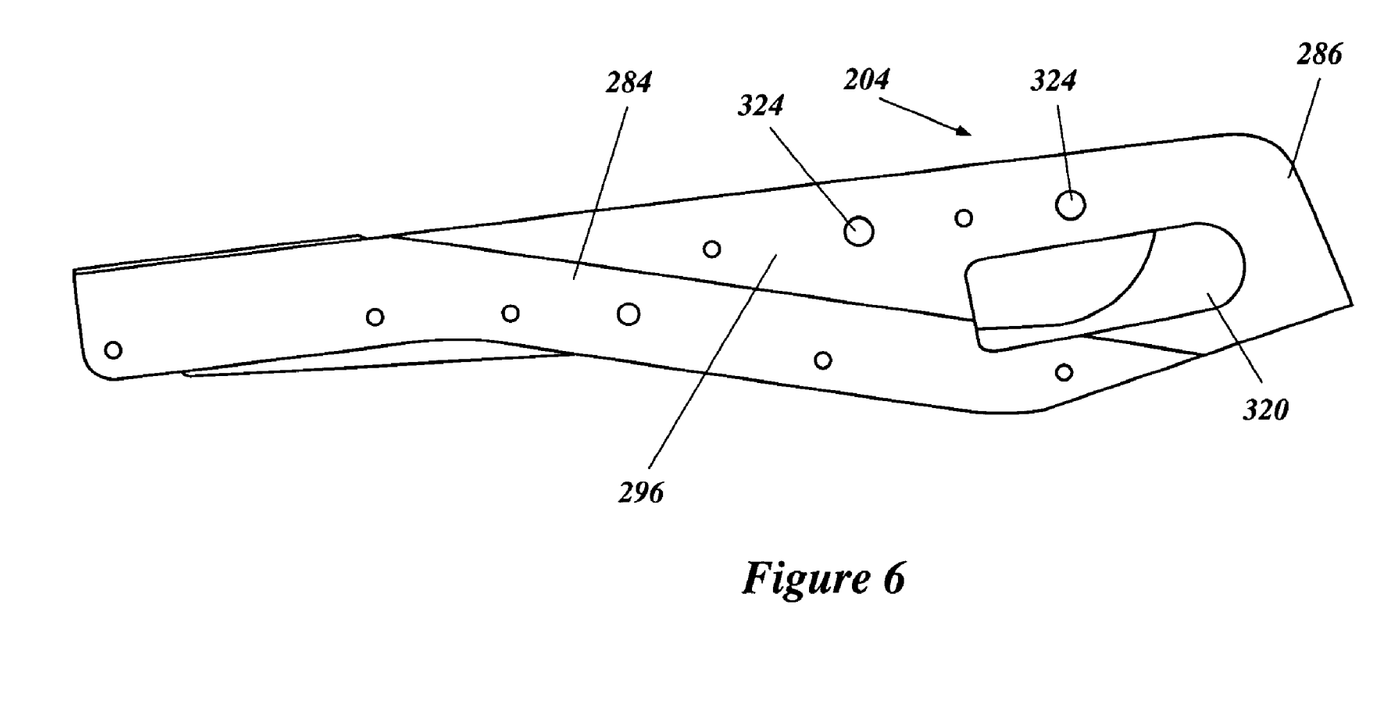
FIG. 6 is a side elevational view of the rear portion shown in FIG. 5.

The bottom section 282 preferably forms a generally flat and relatively broad area. The illustrated bottom section 282 also forms a pair of openings 290 which are disposed side by side. The drive belt 70 in part extends under the openings 290. Thus, the snow raised by the drive belt 70 while the snowmobile 20 proceeds along the terrain can enter the rear frame 204 through the openings 290 and can cool the silencer box 118 which is located on the rear frame 204 as described below.

The side and rear sections 284, 286 preferably define an inner wall 294 and an outer wall 296. The inner wall 294 is continuously formed through the side and rear sections 284, 286. The outer wall 296 also is continuously formed through the side and rear sections 284, 286. The inner and outer walls 294, 298 are spaced apart from each other and a top wall 300 connects the inner and outer walls 294, 298. Thus, a channel 302 (FIG. 7) is formed under the top wall 300.

Figure 7:
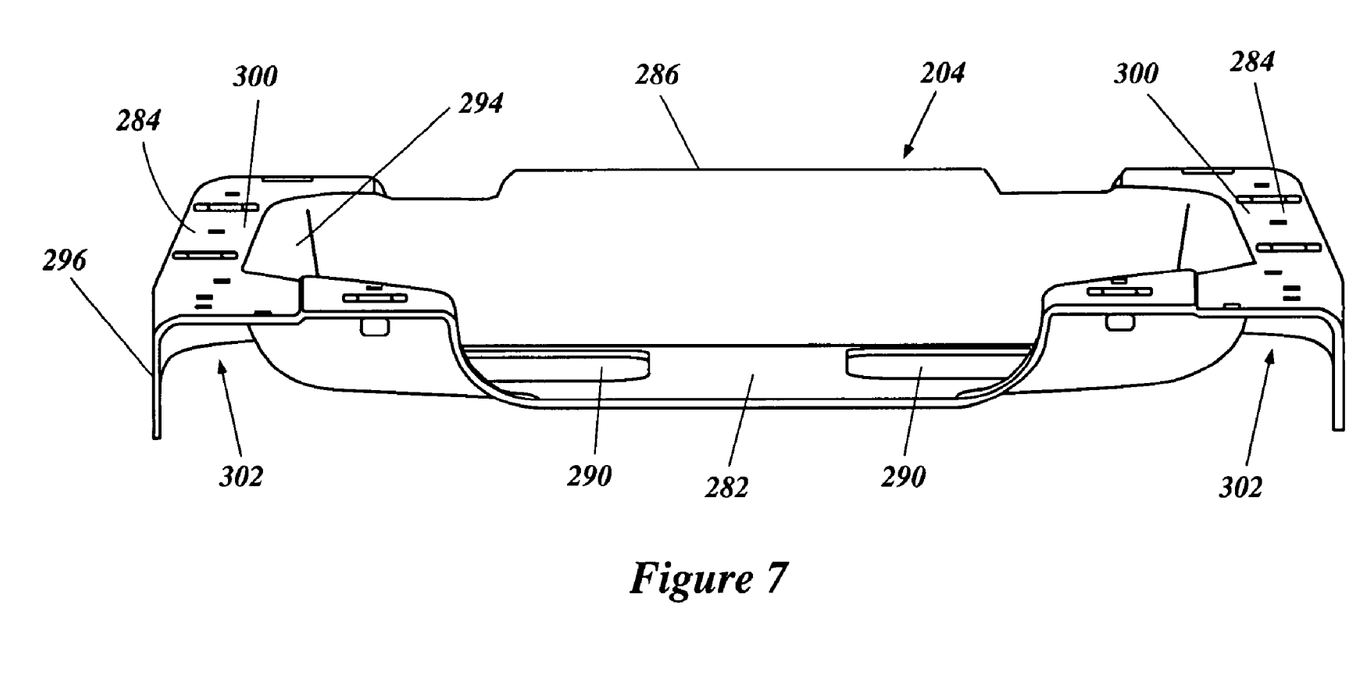
FIG. 7 is a front elevational view of the rear portion shown in FIG. 5.

Preferably, at least a portion of at least one of the inner and outer walls 294, 296 is beveled. For example, at least a portion of the inner wall 294 preferably extends from the bottom section 282 at an angle between 0° and 90°. Additionally, at least a portion of the inner wall preferably extends from the top wall 300 at an angle between 0° and 90°. Further, at least a portion of the outer wall 296 extends from the top wall 300 at an angle between 0° and 90°.

At the forward portions 306 of the inner wall 294, the spacing between the outer wall 298 and the inner wall 294 is greater than the spacing along the remainder of the inner wall 294. Accordingly, each forward portion 308 of the top wall 300 corresponding to the forward portion 306 of the inner wall 294 has a broader area than the remainder of the top wall 300. The rear frame 204 thus has a generally C-shaped peripheral rampart. This C configuration is advantageous because the rampart enhances rigidity of the rear frame 204 and also provides a sufficient recessed space.

With reference to FIG. 3, the rear portion of the body frame 200 extends slightly upwardly and rearwardly. In the illustrated embodiment, rear ends of the side vertical sections 210 extend in such a way. The forward portion of the rear frame 204 is fitted into a space formed between the rear ends of the side vertical sections 210. Accordingly, the rear frame 204 extends slightly upwardly and rearwardly.

With reference to FIG. 4, the silencer box 118 preferably is placed in the recessed space surrounded by the rampart. The illustrated silencer box 118 is configured to nest with the recessed space and is affixed to the rear frame 204 with brackets 312 extending from the silencer box 118 affixed to the top wall 300 by bolts 314. The silencer box 118 preferably is formed with upper and lower members. The members can be made of sheet metal and is formed by, for example, a press working. The upper and lower members are coupled with each other.

The combination of the rear frame 204 with the silencer box 118 can have sufficient rigidity and the silencer box 118 can be well protected. In addition, the silencer box 118 can have enough volume because the silencer box 118 is placed at the recessed space.

With reference to FIG. 4, an upper half of the silencer box 118 is covered with a heat isolating cover 316 via a heat insulator (not shown). The illustrated exhaust pipes 120 extend from rear and side corners of the silencer box 118. Alternatively, the exhaust pipes 120 can extend from a bottom surface of the silencer box 118.

A portion of the delivery conduit 514 of the engine cooling system 214 preferably extends through the channel 302 defined under the top wall 300. Slots 320 are formed on both sides of the outer wall 296. Each slot 320 preferably is positioned at a rear portion of the outer wall 296. The delivery conduit 514 enters the channel 302 through one of the slots 320 and exits through the other slot 320. The portion of the delivery conduit 514 thus is nested within a portion of the groove 302 that extends transversely across the rear frame 204.

As such, the rear frame 204 can protect the portion of the delivery conduit 514. In addition, because the channel 302 opens downwardly, the snow raised by the drive belt 70 during operation can splash onto the delivery conduit 514. The water flowing through the delivery conduit 514 can thus be efficiently cooled by the snow.

Figure 8:
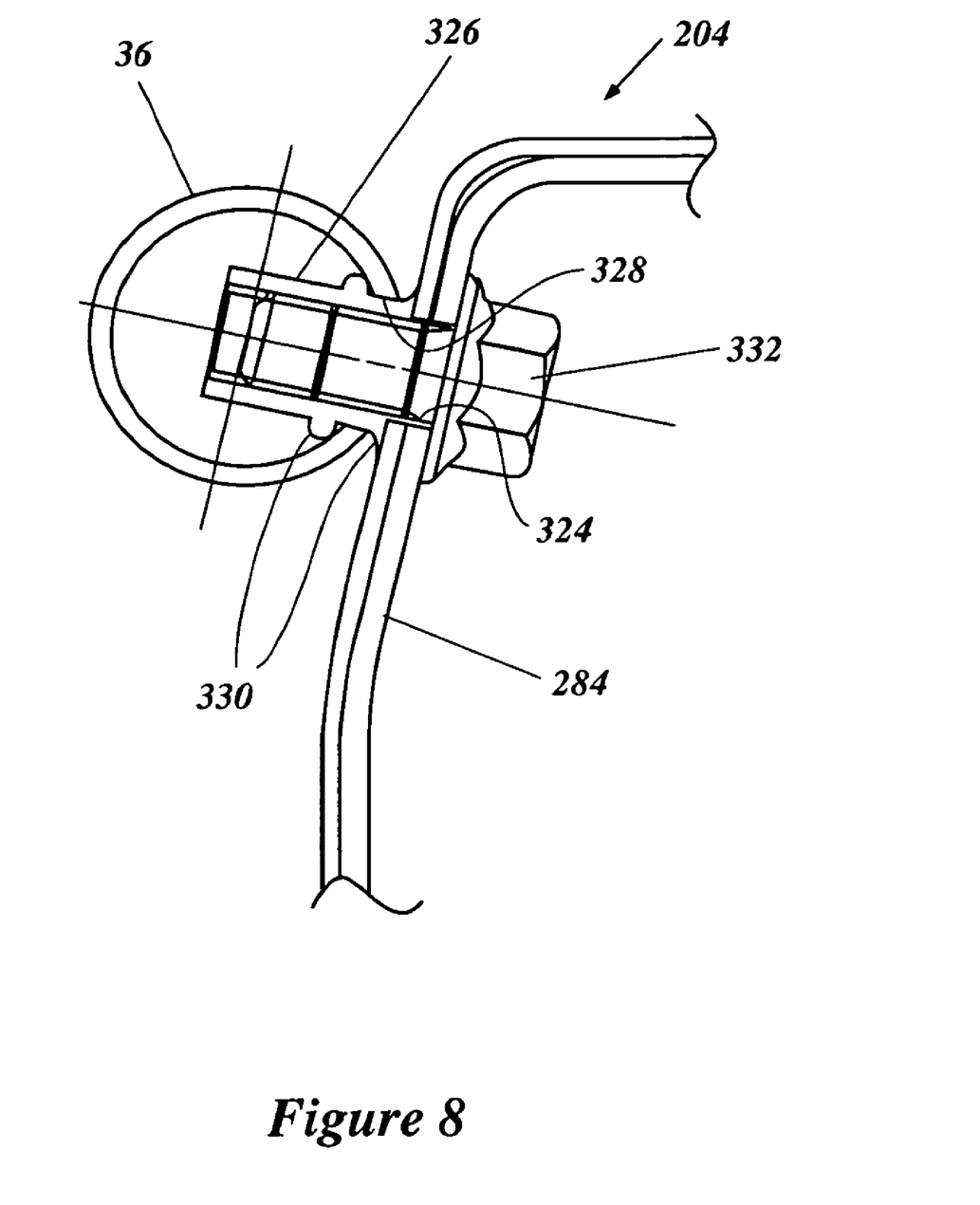
FIG. 8 is an enlarged and partial cross-sectional view of a grab handle attached to the rear portion shown in FIG. 5.

With reference to FIG. 8, the grab bar 36 preferably is affixed to the side sections 284 of the rear frame 204. Apertures 324 (FIGS. 5, 6 and 8) are formed on the outer wall 296. Nuts 326 preferably extend into the grab bar 36, which preferably is a pipe, through apertures 328 formed on the grab bar 36. The nuts 326 are pulled with high force so as to plastically deformed and thus form small projections 330. The projections 330 fix the nuts 326 onto the grab bar 36. Bolts 332 are inserted into the apertures 324 of the rear frame 204 and then into the nuts 326. The grab bar 36 thus is affixed to the side section 284 of the rear frame 204.

The same snowmobile is disclosed in co-pending U.S. applications, which attorney docket numbers are FY.50084US0A and FY.50086US0A, both titled FRAME ASSEMBLY FOR SNOWMOBILE, the entire contents of which are hereby expressly incorporated by reference.

Although the present invention has been described in terms of a certain embodiment, other embodiments apparent to those of ordinary skill in the art also are within the scope of this invention. Thus, various changes and modifications may be made without departing from the spirit and scope of the invention. The scope of the present invention is intended to be defined only by the claims that follow.

What is claimed is:

1. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, wherein the bottom section forms an upwardly facing recessed space surrounded by the side and rear sections and wherein each one of the side and rear sections forms an inner wall, an outer wall and a top wall connecting the inner and outer walls, the inner and outer walls being spaced apart from each other.

2. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, wherein the bottom section forms a recessed space surrounded by the side and rear sections and wherein a forward end of at least one of the side sections is wider than another portion of the side section.

3. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, wherein the bottom section forms a recessed space surrounded by the side and rear sections and additionally comprising an internal combustion engine configured to power the drive assembly, and an exhaust system configured to discharge combustion byproducts from the engine, the exhaust system comprising an exhaust silencer defining a chamber therein to reduce exhaust noise, the exhaust silencer at least in part being disposed at the recessed space of the bottom section.

4. The snowmobile as set forth in claim 3, wherein the rear frame portion defines an opening at the bottom section, the drive assembly comprises a drive belt disposed below the opening.

5. The snowmobile as set forth in claim 1 additionally comprising a grab bar affixed to the rear frame portion.

6. The snowmobile as set forth in claim 5, wherein the grab bar is affixed to the side sections.

7. The snowmobile as set forth in claim 1, wherein the body frame extends generally horizontally, a rear end of the body frame extends generally upwardly and rearwardly, the rear frame portion being coupled with the rear end of the body frame.

8. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, wherein each one of the side and rear sections forms an inner wall, an outer wall and a top wall connecting the inner and outer walls, the inner and outer walls being spaced apart from each other, wherein a forward portion of the inner wall is spaced apart from a forward portion of the outer wall greater than another portion of the inner wall.

9. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, an internal combustion engine that powers the drive assembly, and a cooling system configured to cool the engine, the cooling system comprising a coolant conduit extending out of the engine, at least one of the side and rear sections forming an inner wall, an outer wall and a top wall connecting the inner and outer walls, the inner and outer walls are spaced apart from each other, the coolant conduit at least in part extending in a space formed between the inner and outer walls.

10. The snowmobile as set forth in claim 9, wherein the body frame forms a foot step, the cooling system comprises a heat exchange device disposed at the foot step.

11. A snowmobile comprising a frame assembly, and a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, wherein at least one of the side sections is formed thicker in width at a forward end than another portion of the side section.

12. A snowmobile comprising a frame assembly, a drive assembly depending from the frame assembly, the drive assembly being adapted to abut terrain so as to propel the frame assembly along the terrain, the frame assembly comprising a body frame, and a rear frame portion coupled with the body frame, the rear frame portion defining a generally horizontally extending bottom section, side sections extending generally vertically from side portions of the bottom section, a rear section extending generally vertically from a rear portion of the bottom section, the bottom, side and rear sections being monolithically formed with each other, an internal combustion engine that powers the drive assembly, an exhaust system configured to discharge combustion byproducts of the engine, the exhaust system comprising an exhaust silencer defining a chamber therein to reduce exhaust noise, the exhaust silencer at least in part being disposed on the bottom section.

13. The snowmobile as set forth in claim 1, wherein the rear frame portion defines an opening at the bottom section, the drive assembly comprises a drive belt disposed below the opening.

14. A snowmobile comprising a frame assembly, and a drive assembly depending from the frame assembly and adapted to abut terrain so as to propel the frame assembly along the terrain, the frame assembly comprising a body frame, and a rear frame coupled with the body frame, the rear frame defining a generally horizontally extending bottom section, side sections extending generally upwardly from side portions of the bottom section, a rear section extending generally upwardly from a rear portion of the bottom section, each one of the side and rear sections forming an inner wall, an outer wall and a top wall connecting the inner and outer walls, the inner and outer walls being spaced apart from each other, and the bottom section being recessed downwardly from the top wall, thereby defining an upwardly facing recess.

15. A snowmobile comprising a frame assembly, and a drive assembly depending from the frame assembly and adapted to abut terrain so as to propel the frame assembly along the terrain, the frame assembly comprising a body frame, and a rear frame coupled with the body frame, the rear frame defining a generally horizontally extending bottom section, side sections extending generally vertically from side portions of the bottom section, a rear section extending generally vertically from a rear portion of the bottom section, each one of the side and rear sections forming an inner wall, an outer wall and a top wall connecting the inner and outer walls, the inner and outer walls being spaced apart from each other, wherein a forward portion of the inner wall is spaced apart from a forward portion of the outer wall greater than another portion of the inner wall.

16. The snowmobile as set forth in claim 14, wherein the rear frame is a single monolithic component.

* * * * *

UNITED STATES PATENT AND TRADEMARK OFFICE
CERTIFICATE OF CORRECTION

| | | |
|---|---|---|
| PATENT NO. | : 7,063,178 B2 | Page 1 of 1 |
| APPLICATION NO. | : 10/213726 | |
| DATED | : June 20, 2006 | |
| INVENTOR(S) | : Toyochika Etou | |

It is certified that error appears in the above-identified patent and that said Letters Patent is hereby corrected as shown below:

Title page, item (56), please insert --2002/0100631 A1  08/2002  Nishijima--

Signed and Sealed this

Thirtieth Day of January, 2007

JON W. DUDAS
*Director of the United States Patent and Trademark Office*